United States Patent
Kubrak et al.

(10) Patent No.: US 9,612,336 B2
(45) Date of Patent: Apr. 4, 2017

(54) METHOD AND SYSTEM FOR DETECTING ANOMALIES ON SATELLITE NAVIGATION SIGNALS AND HYBRIDIZATION SYSTEM COMPRISING SUCH A DETECTION SYSTEM

(71) Applicant: THALES, Neuilly-sur-Seine (FR)

(72) Inventors: Damien Kubrak, Toulouse (FR); Damien Serant, Toulouse (FR)

(73) Assignee: Thales, Courbevoie (FR)

( * ) Notice: Subject to any disclaimer, the term of this patent is extended or adjusted under 35 U.S.C. 154(b) by 683 days.

(21) Appl. No.: 14/106,486

(22) Filed: Dec. 13, 2013

(65) Prior Publication Data
US 2014/0313077 A1    Oct. 23, 2014

(30) Foreign Application Priority Data
Dec. 14, 2012 (FR) ..................... 12 03406

(51) Int. Cl.
*G01S 19/20* (2010.01)
*G01S 19/22* (2010.01)

(52) U.S. Cl.
CPC .............. *G01S 19/20* (2013.01); *G01S 19/22* (2013.01)

(58) Field of Classification Search
CPC ................................ G01S 19/20; G01S 19/22
USPC ...................................................... 342/357.58
See application file for complete search history.

(56) References Cited

U.S. PATENT DOCUMENTS

| | | | |
|---|---|---|---|
| 6,198,765 B1 | 3/2001 | Cahn et al. | |
| 2005/0114023 A1 | 5/2005 | Williamson et al. | |
| 2009/0016414 A1* | 1/2009 | Lillo | G01S 19/47 375/150 |
| 2010/0061427 A1* | 3/2010 | Lopez-Risueno | G01C 21/206 375/150 |
| 2012/0140857 A1* | 6/2012 | Floch | G01S 19/30 375/342 |

FOREIGN PATENT DOCUMENTS

WO     2004/031797 A1     4/2004

* cited by examiner

*Primary Examiner* — Harry Liu
(74) *Attorney, Agent, or Firm* — Baker Hostetler LLP

(57) ABSTRACT

A method for detecting anomalies on satellite navigation signals consists in extracting the code error values delivered at the output of the N code discriminators, and comparing the extracted code error values with a same first threshold value corresponding to an acceptable maximum code error value and assigning a confidence index to each navigation signal received on each reception channel i, the confidence index depending on the result of the comparison carried out on the code error values.

5 Claims, 6 Drawing Sheets

METHOD AND SYSTEM FOR DETECTING ANOMALIES ON SATELLITE NAVIGATION SIGNALS AND HYBRIDIZATION SYSTEM COMPRISING SUCH A DETECTION SYSTEM

CROSS-REFERENCE TO RELATED APPLICATION

This application claims priority to foreign French patent application No. FR 1203406, filed on Dec. 14, 2012, the disclosure of which is incorporated by reference in its entirety.

FIELD OF THE INVENTION

The present invention relates to a method and a system for detecting anomalies on satellite navigation signals and a hybridization system comprising such a detection system. It applies to any satellite positioning system using satellite positioning receivers of GNSS (Global Navigation Satellite System) type, such as GPS (Global Positioning System) or Galileo receivers, and in particular to the terrestrial GNSS receivers.

BACKGROUND

In a satellite positioning system using a satellite positioning receiver of GNSS type arranged on board a terrestrial, maritime or airborne vehicle, the data signals enabling the receiver to calculate its positioning originate from different satellites belonging to a constellation of positioning satellites. The constellation comprises at least four satellites for determining four unknowns corresponding to the geographic coordinates x, y, z and temporal coordinates t of the receiver. The positioning of the vehicle by the receiver is performed in two steps. In a first step, the receiver acquires radiofrequency signals constituting navigation signals originating from the four satellites of the constellation and in a second step the receiver evaluates the distances separating the vehicle from the four satellites from which the signals have been received and determines the position of the vehicle by using a trilateration method.

An error committed on the position of a vehicle can have disastrous consequences in an application relating to civil aviation geolocated road toll.

There are many sources of positioning error that can affect the validity of position information determined by a satellite positioning system. A positioning error can be due to a technical problem on the reception of the GNSS signals, such as, for example, a failure of the receiver, or a failure of the information transmitted by the constellation of satellites, or a satellite failure. The reliability of the position determined by a satellite positioning system depends also on the environment in which the vehicle is located and a positioning error can also be due notably to a stray reflection on a building, or to interference on the signal.

In the case of an aeronautical application, the receiver is not constrained by any obstacle, so that the radiofrequency signals are received directly from the satellites, without reflection on any wall. In this case, there are SBAS (Satellite-Based Augmentation Systems) systems that make it possible to provide confidence information relating to the position calculated by the receiver of an aeronautical vehicle. The SBAS systems permanently monitor and limit the errors committed on the orbit of the satellites, on the synchronization of each satellite with the time reference of the constellations and the errors induced by the propagation of the radiofrequency signals at high atmosphere and in particular in the ionosphere. The information supplied by an SBAS system enables the receiver of the aeronautical vehicle to supply the position of the vehicle as well as a position error limit.

In the case of an aeronautical application, it is also known practice to use an INS/GNSS (Inertial Navigation System/Global Navigation Satellite System) hybrid equipment item combining the information supplied by an inertial unit and the measurements supplied by the satellite navigation system including a GNSS receiver, to obtain vehicle position and speed information. The INS/GNSS hybridization architectures can use different types of coupling between a GNSS receiver and an inertial unit. The coupling can be done either from the calculated position of the GNSS receiver, or from rough measurements of the frequency or the pseudo-distances determined from the navigation signals received from the satellites, or from even more elementary information calculated in the receiver, this latter type of coupling being called ultra-tight coupling. The inertial unit supplies information with little noise and that is accurate in the short term, but the accuracy of the measurements is degraded over the long term because of the drifts of the inertial sensors. The accuracy of the measurements supplied by the GNSS receiver makes it possible to control the inertial drift, and the inertial measurements make it possible to filter the noise on the measurements of the GNSS receiver. This equipment also calculates protection radii around the calculated position which make it possible to contain the position error at a given integrity risk. The protection radii can be calculated by using a channel filter, for example a Kalman filter, which comprises a model of the behaviour of the GNSS receiver and supplies an estimation of receiver distance and speed information. A parameter, called innovation, corresponding to the difference between the measurement of the distance information supplied by the satellite and the estimation of this distance information supplied at the output of the channel filter is then calculated. When the behaviour of the receiver corresponds to the model included in the filter, the innovation parameter has a value close to zero. Otherwise, the GNSS measurement is errored. The innovation parameter therefore makes it possible, in the case of an aeronautical application, to identify GNSS measurements affected by wide errors, possibly occurring notably when a satellite has failed.

The geolocated road toll applications consist in determining the route taken by a terrestrial vehicle provided with a GNSS receiver and in billing a user of the terrestrial vehicle when the route taken is subject to a toll. Since the billing is dependent on the road used, the receiver must deliver two complementary information items concerning, on the one hand, the position of the vehicle and, on the other hand, the trajectory of the vehicle. Since this information gives rise to a billing, it is also necessary to determine trust information concerning the trajectory used.

The integrity of a GNSS position in a constrained medium, for example urban, woody area, mountainous area, is difficult to characterize, notably because of the imprecision of the modeling of the local propagation phenomena. The identification and the characterization of the quality of the GNSS measurements produced by a receiver is all the more difficult. Currently, the checking of the integrity of a GNSS position of a terrestrial vehicle is done in the same way as for civil aviation. When the navigation is performed in an unconstrained environment, for example in the countryside or in a fairly scattered town, this method is effective.

However, in the case of navigation in a constrained environment, the conditions of reception of the radiofrequency signals are much more complex and much less controlled than in the case of an aeronautical application and the signals received are much more noisy and have a much weaker intensity. The error models designed for the applications of civil aviation therefore do not correspond to the constrained environments and it is not possible to clearly identify the position of a terrestrial vehicle on a traffic lane. Moreover, for a constrained environment, no reliable GNSS measurement quality indicator is currently available.

SUMMARY OF THE INVENTION

The aim of the invention is to propose a method and a system for detecting anomalies on satellite navigation signals that make it possible to detect an anomaly on navigation signals received by a satellite positioning receiver in any environment, unconstrained or constrained, even when the signals are of weak intensity and very noisy.

For this, the invention relates to a method for detecting anomalies on navigation signals received by N reception channels of a satellite positioning receiver, where N is an integer number greater than 1, each channel i, where i is between 1 and N, comprising a carrier correlation circuit, a code correlation circuit including spot, advance and delay correlators, a code discriminator, a carrier phase discriminator, the code and carrier phase discriminators being connected to a common channel filter suitable for managing, jointly, the position of the spot, advance and delay correlators of the N reception channels to reduce code and carrier phase error values delivered by the code and carrier phase discriminators. The method consists in extracting the code error values delivered at the output of the N code discriminators, in comparing the extracted code error values with a same first threshold value corresponding to an acceptable maximum code error value and in assigning a confidence index to each navigation signal received on each reception channel i, the confidence index depending on the result of the comparison carried out on the code error values.

Advantageously, the method can also consist in extracting carrier phase error values delivered at the output of the N carrier phase discriminators, in comparing the extracted carrier phase error values with a same second threshold value corresponding to an acceptable maximum phase error value and in assigning a confidence index to each navigation signal received on each reception channel, the confidence index depending on the results of the comparison carried out on the code error values and on the carrier phase error values.

Advantageously, the method can also consist in selecting navigation signals having a confidence index higher than a reference minimum confidence level and in transmitting to the channel filter only the selected navigation signals.

The invention also relates to a system for detecting anomalies on navigation signals comprising a satellite positioning receiver with N reception channels, where N is an integer number greater than 1, each channel i, where i is between 1 and N, comprising a carrier correlation circuit, a code correlation circuit including spot, advance and delay correlators, a code discriminator, a carrier phase discriminator, the code and carrier phase discriminators being connected to a common channel filter suitable for managing, jointly, the position of the spot, advance and delay correlators of the N reception channels to reduce code and carrier phase error values delivered by the code and carrier phase discriminators. The system also comprises a device for detecting anomalies on the navigation signals comprising at least one comparison device comprising a first set of N comparators respectively connected to the output of the N code discriminators of the N channels of the receiver and a device for assigning a reliability confidence index connected to the output of the N comparators of the comparison device, the comparison device including a first threshold value corresponding to an acceptable maximum code error value and the confidence index being assigned to each navigation signal received on each reception channel as a function of the result of the comparison carried out on the code error values and delivered by the comparison device.

Advantageously, the comparison device can also comprise a second set of N comparators respectively connected to the output of the N carrier phase discriminators of the N channels of the receiver and the device for assigning a reliability confidence index is connected to the output of the first and the second set of N comparators, of the comparison device, the comparison device also including a second threshold value corresponding to an acceptable maximum carrier phase error value and the confidence index being assigned to each navigation signal received on each reception channel as a function of the result of the comparison carried out on the code error values and on the carrier phase error values and delivered by the comparison device.

Advantageously, the anomaly detection device is connected between the discriminators of the receiver and the channel filter and the anomaly detection device also comprises a device for selecting navigation signals, the selection device being connected to the output of the device for assigning the reliability index and to the input of the channel filter, the device for selecting navigation signals being suitable for selecting the navigation signals that have a confidence index higher than the reference minimum confidence level and for transmitting to the channel filter only the code error values and the carrier phase error values of the selected navigation signals.

The invention relates also to an INS/GNSS hybridization system comprising a system for receiving navigation signals and an inertial unit.

BRIEF DESCRIPTION OF THE DRAWINGS

Other features and advantages of the invention will become clearly apparent from the following description, given as a purely illustrative and nonlimiting example, with reference to the appended schematic drawings which represent.

DETAILED DESCRIPTION

Figure 1:
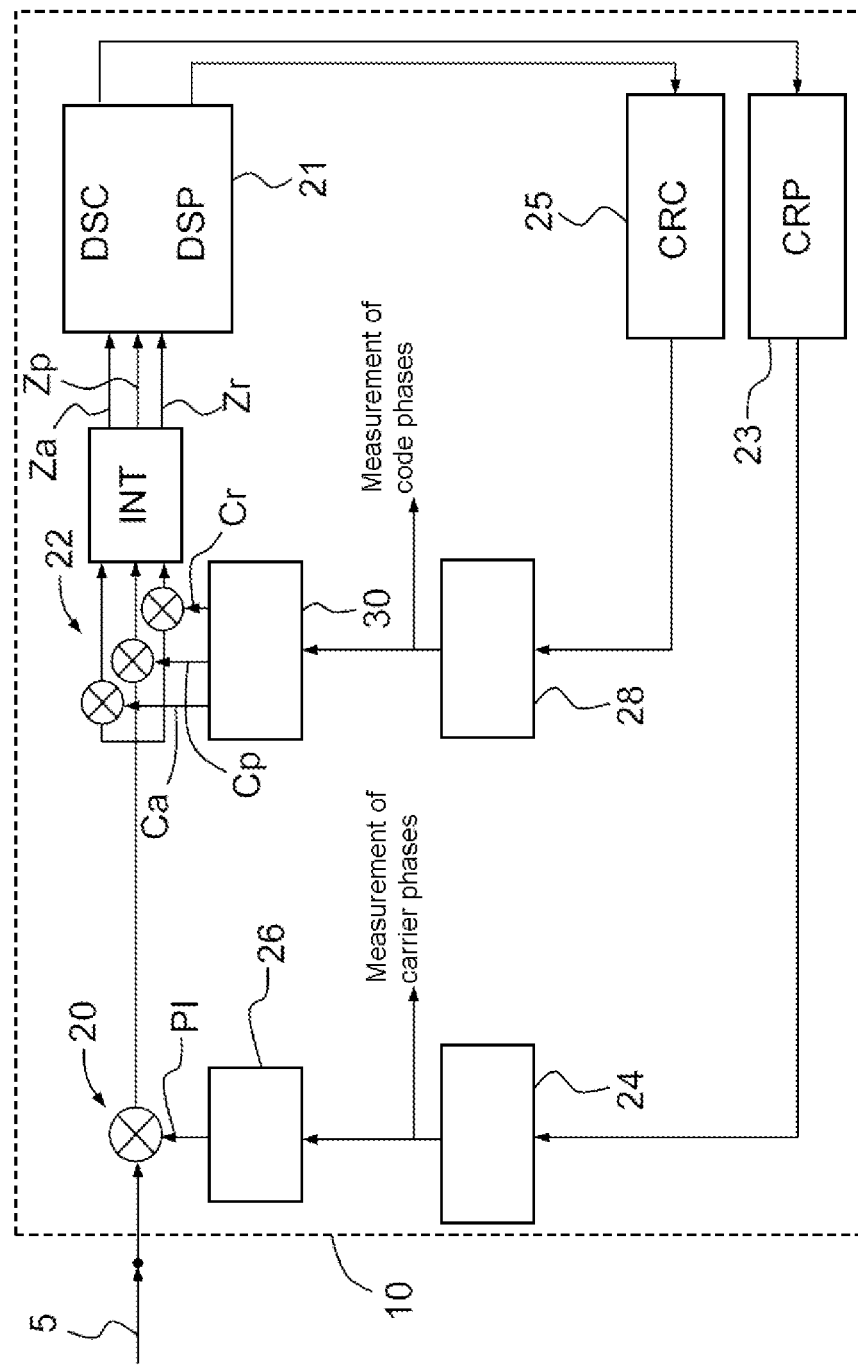
FIG. 1: a simplified diagram of an exemplary architecture of a GNSS receiver in which a single channel is represented, according to the prior art.

The navigation signals emitted by the satellites of a constellation are radiofrequency signals made up of data to be transmitted, spread in frequency by a pseudo-random binary spreading code and transposed into a transmission frequency band by modulation with a transmission carrier. The satellite positioning receiver of GNSS type comprises a number of different processing channels making it possible to process in parallel the signals received from different satellites. Two different satellites have different and decorrelated codes which make it possible to dissociate the signals between the satellites and to allocate a different channel to each satellite. FIG. 1 represents a simplified diagram of an exemplary architecture of a satellite positioning receiver in which a single channel is represented. In reception, the data contained in each signal 5 received by the satellite positioning receiver 10 are extracted by two successive demodulations performed by a carrier correlation circuit 20 intended for the suppression of the carrier of the received signal, followed by a code correlation circuit 22. For this, the satellite positioning receiver 10 creates a local replica Pl of the carrier generated by a local oscillator 24 driven by a frequency and phase tracking loop, called phase loop 20, and a local replica of the pseudo-random spreading code generated by a local code generator 28 driven by a delay tracking loop, called code loop 22. The techniques for tracking the received signal entail creating a local replica of the spreading code, called spot replica Cp, and other advance mode Ca and delay mode Cr local replicas. The roll of the integrators INT is to produce advance Za, spot Zp, delay Zr signal samples that are demodulated and unspread, and aggregated. When a code loop 22 is locked on, the code generated locally is in phase with the code contained in the signal received from the satellite and the correlation function obtained corresponds to a maximum. The phase loop 20, respectively the code loop 22, comprises a carrier DSP and code DSC discriminator 21, making it possible to measure, using the values of the signal samples Zp, Za, Zr delivered by the integrator INT at the output of the spot, advance and delay correlators, the carrier phase differences, respectively the code differences, between the received signal and the local signal, for retroaction in the corresponding phase and code tracking loops 20, 22 in order to update the estimation of the carrier frequency of the received signal, respectively the offset of the spreading code measured relative to the local code.

At the output of the carrier DSP and code DSC discriminator 21, the carrier phase differences are transmitted to a carrier corrector CRP 23 controlling a carrier oscillator 24 generating a local carrier phase driving a carrier generator 26 which supplies the local carrier used by the carrier correlation circuit 20 for the suppression of the carrier of the received signal. Similarly, at the output of the discriminator 21, the code differences are transmitted to a code corrector CRC 25 controlling a code oscillator 28 generating a local code phase driving the code generator 30 which supplies local codes Ca, Cp, Cr used by the code correlation circuit 22. In a conventional satellite positioning receiver architecture, the output of each discriminator 21 is constrained, by the code tracking loop 22, to deliver a value close to zero to maintain the synchronization of the local code on the satellite code.

The synchronization of the local codes is thus performed satellite by satellite independently of the other satellites. When the GNSS receiver is used on its own, it is very difficult to identify an errored navigation signal and the position information obtained is not reliable.

Figure 2:
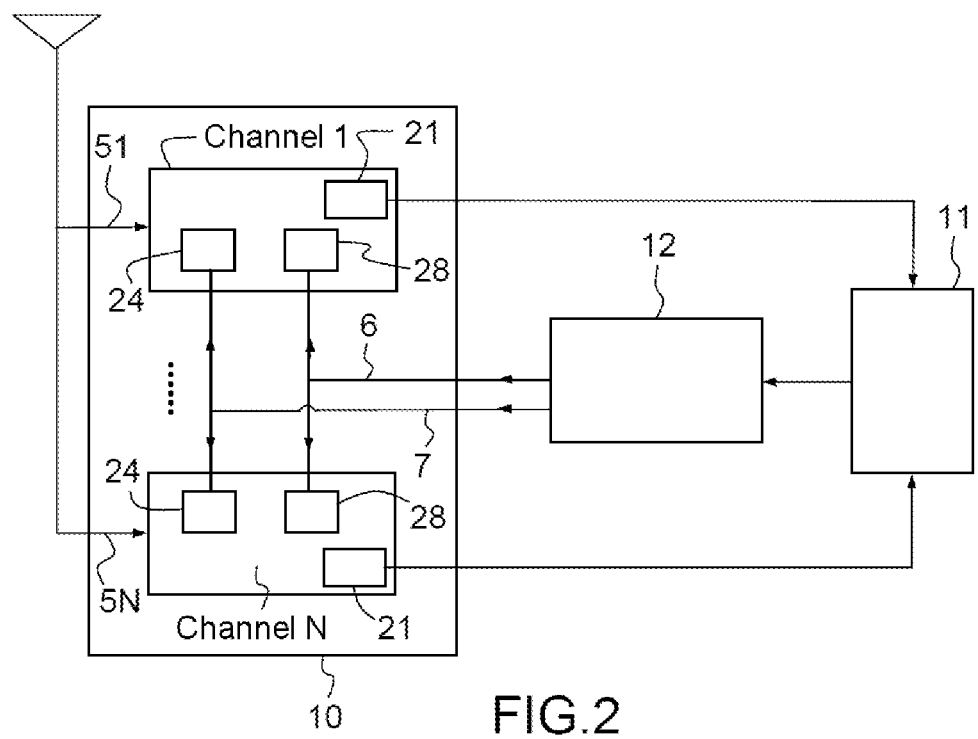
FIG. 2: a diagram of a first exemplary architecture of a GNSS reception system comprising a GNSS receiver incorporated in a vectorized loop architecture, according to the prior art.
Figure 3:
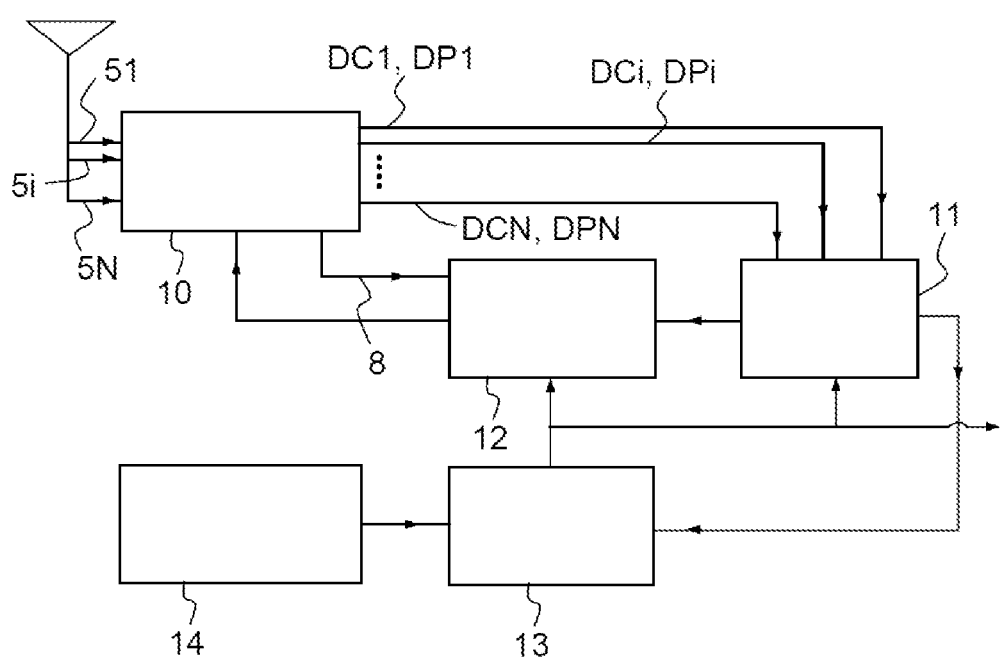
FIG. 3 a diagram of a second exemplary architecture of a GNSS reception system comprising a GNSS receiver incorporated in an INS/GNSS hybridization architecture, according to the invention.

The receiver 10 can be incorporated in a vectorized loop-type architecture, as represented for example in the diagram of FIG. 2, or in an INS/GNSS hybridization architecture as represented for example in the diagram of FIG. 3. In these two types of architecture, the measurements of position and speed of the receiver 10 are determined by taking into account the error residues of an innovation parameter delivered at the output of a channel filter 11, for example a Kalman filter.

In the case of the vectorized loop architecture represented in FIG. 2, the channel filter 11, for example a Kalman filter, takes into account all the information extracted from the N navigation signals 51, . . . 5N received by the receiver 10 to calculate the innovation parameter corresponding to the difference between the measurements reported by the receiver 10 and the prediction of these measurements made by a mathematical model included in the channel filter 11 and deduces therefrom an estimation of the offset of the code and carrier clocks of the receiver 10 relative to the N satellites having emitted the N signals 51 to 5N. The code offset, respectively the carrier offset, delivered at the output of the channel filter 11, is applied to the input of a device 12 for predicting the Doppler effect on the code and the carrier, this Doppler effect being due to the movement of the satellites, to the movement of the local oscillator of the receiver and to the movement of the receiver 10. The device 12 for predicting the Doppler effect delivers as output new code and phase clock position command values which are applied to the local oscillators 28 of the code loops, respectively to the local oscillators 24 of the phase loops, of the N channels of the receiver 10 in order to update, simultaneously, the code and phase clocks of all the channels from one and the same code 6, respectively phase 7, command value. The startup of the local spreading codes used for the correlation is thus triggered simultaneously in all the channels. This vectorized loop architecture therefore makes it possible to take into account, jointly, a set of information obtained from the discriminators 21 of all the channels of the receiver 10 to simultaneously correct, by a same value, on each iteration, the position of the spot Cp, advance Ca and delay Cr correlators, in all the reliable channels of the receiver 10. In this vectorized loop architecture, the position of the correlators of all the channels is therefore managed in common by the channel filter 11, and the output signals of the code and carrier discriminators 21 are not constrained.

In the case of the INS/GNSS hybridization architecture represented in FIG. 3 which relates to a coupling of ultra-tight type, in addition to the information extracted from the set of navigation signals by the satellite positioning receiver 10 to calculate the innovation parameter, the channel filter 11 also takes into account position, speed and acceleration information, transmitted by an inertial unit 14 placed on board the vehicle in which the receiver 10 is located. From all the information extracted from the navigation signals 51, . . . , 5i, . . . , 5N, and from the information obtained from the inertial unit 14, the channel filter 11 jointly estimates the new position of the spot Cp, advance Ca and delay Cr correlators of all the channels, 1 to N, of the receiver 10. A navigation computer 13 connected at the output of the inertial unit 14 receives position information delivered by the inertial unit 14 and position, speed and acceleration error information estimated by the channel filter 11 from the error values DC1, DP1, . . . , DCi, DPi, . . . , DCN, DPN, obtained from the discriminators 21 of each channel 1, . . . i, . . . , N, of the receiver 10. From the information originating from the inertial unit 14 and from the channel filter 11, the navigation computer 13 delivers new position, speed and attitude values of the vehicle in which the receiver 10 and the inertial unit 14 are located. These new position, speed and attitude values are applied to the input of a device 12 for predicting the Doppler effect on the code and the carrier which also receives additional information transmitted by the receiver 10 from signals originating from the satellites and the code and carrier offsets originating from the channel filter 11. The additional information 8 transmitted by the receiver 10 to the device 12 for predicting the Doppler effect comprise ephemerides data and a propagation error estimation which make it possible to deduce an approximation of the propagation delay of the signals originating from the satellites, this delay being introduced notably by the ionosphere, the troposphere and by the clock of the satellite. The device 12 for predicting the Doppler effect delivers, as output, new code and phase clock position command values to be applied to all the channels, 1 to N, to simultaneously and jointly correct, by one and the same value, on each iteration, the position of the spot Cp, advance Ca and delay Cr correlators in all the channels of the receiver 10. As for the vectorized loop architecture, in this INS/GNSS hybridization architecture, the position of the correlators of all the channels is managed in common by the channel filter 11, and the output signals of the code DSC and carrier DSP discriminators 21 are not constrained.

Figure 4A:
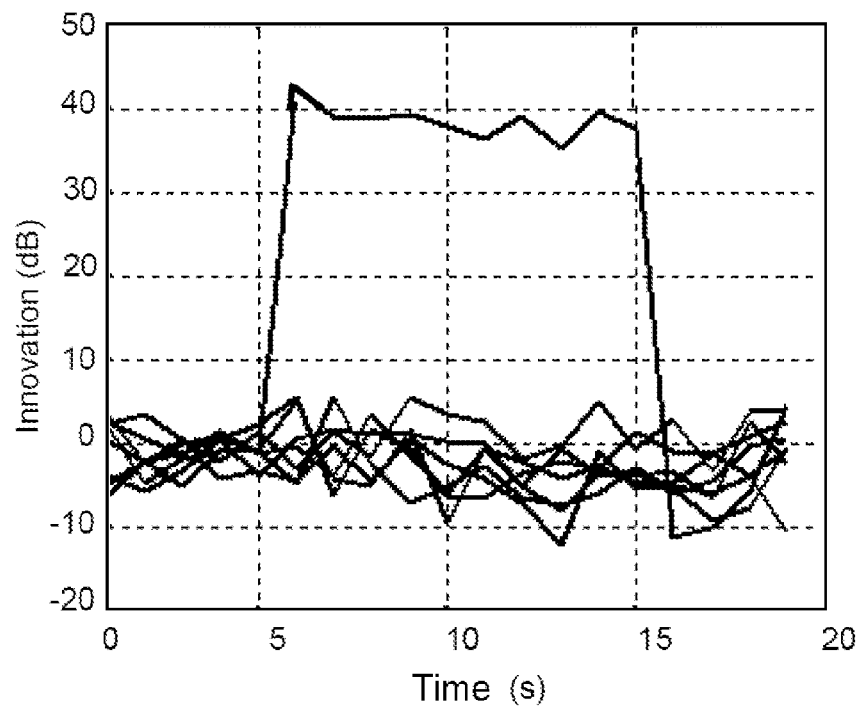
FIGS. 4a and 4b: two curves illustrating the trend, as a function of time, of the innovation parameters delivered at the output of a Kalman filter of a hybridization architecture of ultra-tight coupling type, according to the prior art.
Figure 4B:
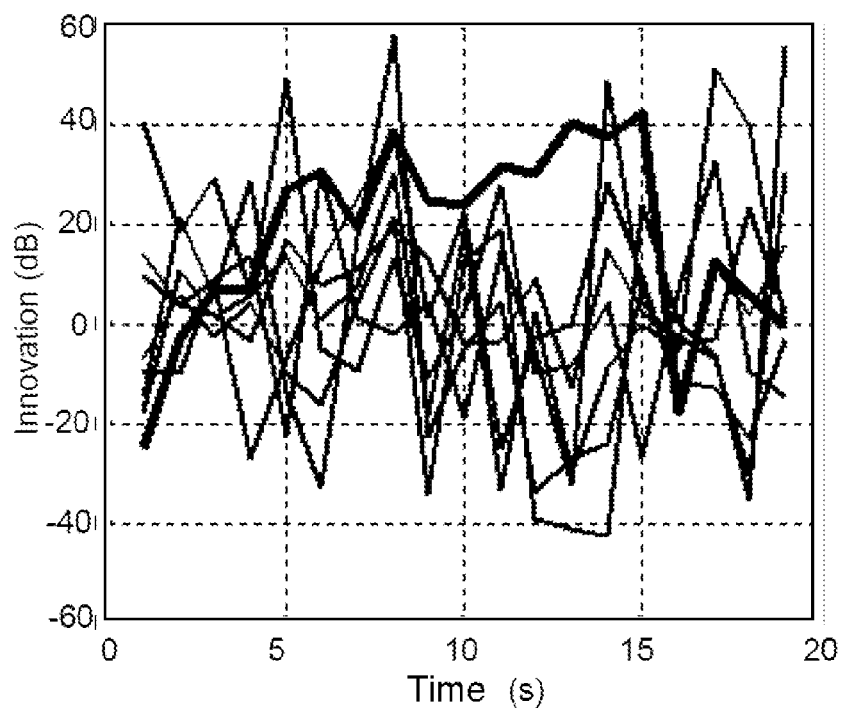

FIGS. 4a and 4b represent two examples of curves illustrating the trend, as a function of time, of the innovation parameters delivered at the output of a Kalman filter of a hybridization architecture of ultra-tight coupling type, for noisy signals in which the levels of the signal-to-noise ratio C/N0 are respectively 40 dBHz and 19 dBHz. In these two figures, the signals shown by fine lines corresponding to directs paths between a satellite and a satellite positioning receiver, have an innovation parameter which fluctuates about the zero value, whereas an errored signal, represented by a thick line, due for example to a multiple path, that is to say a path which has been reflected by an obstacle situated between a satellite and the satellite positioning receiver, is not centered about the zero value. When the signal-to-noise ratio C/N0 is high, as shown in FIG. 4a, the errored signal can be clearly identified because it is completely offset relative to the other signals. For greater noises corresponding to a lower signal-to-noise ratio C/N0, as shown in FIG. 4b, the errored signal is embedded in the fluctuations of the other signals and cannot be clearly identified. FIGS. 4a and 4b therefore show that the innovation parameter makes it possible to identify the errored signals only in the presence of a noise of intensity much lower than the level of the signal. The higher the noise level relative to the level of the signal, the more difficult it is to identify the errored signals with the innovation parameter.

Figure 5A:
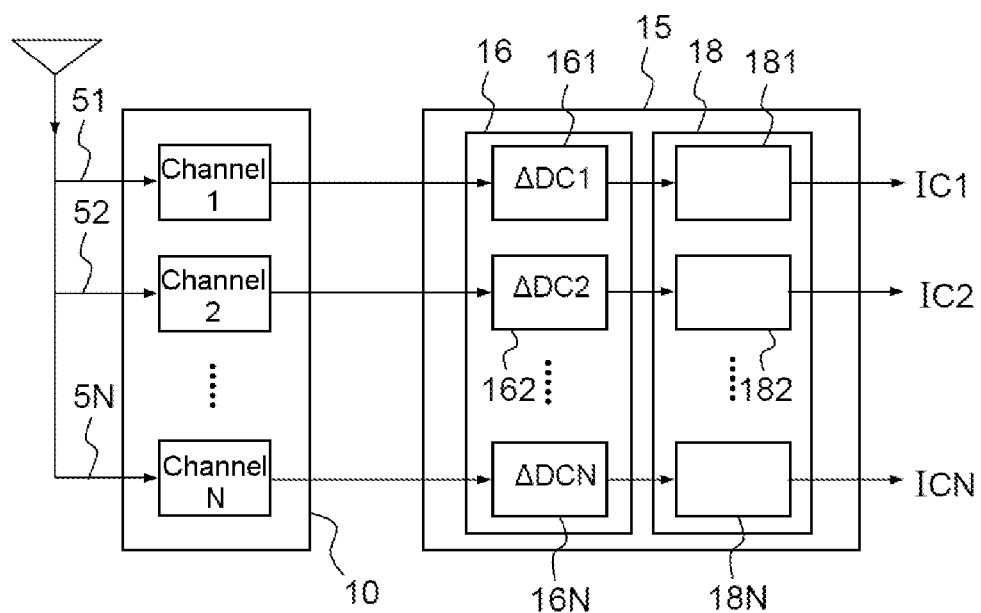
FIGS. 5a and 5b: two exemplary architectures of a system for detecting anomalies on GNSS navigation signals, according to the invention.
Figure 5B:
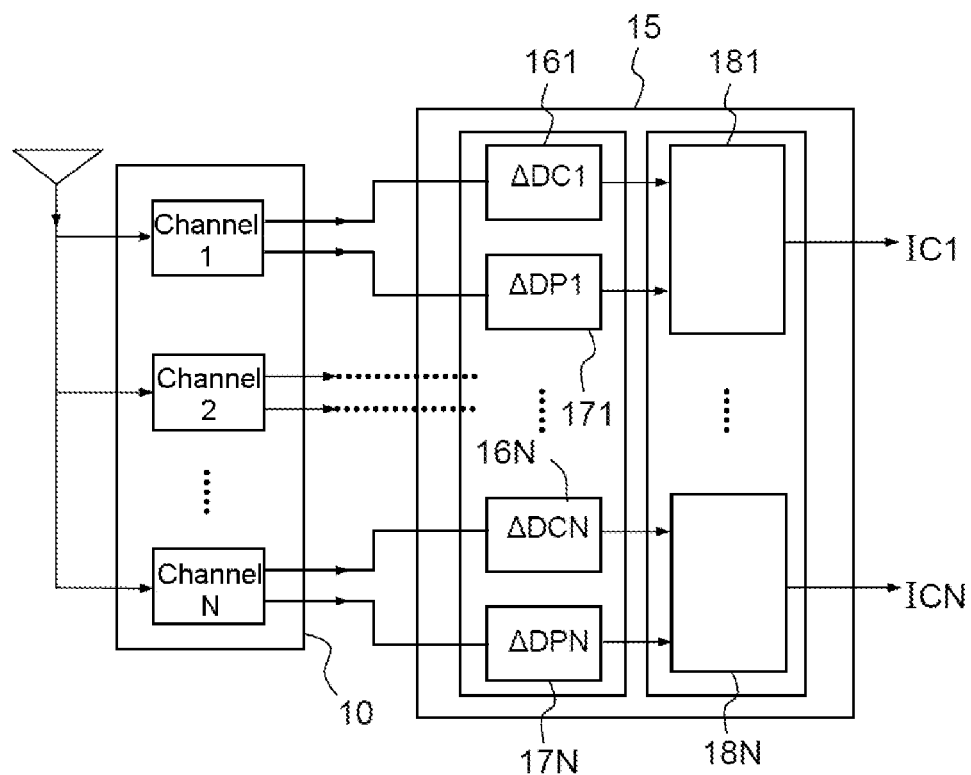

FIGS. 5a and 5b represent two examples of architectures of a system for detecting anomalies on GNSS navigation signals. The anomaly detection system comprises a satellite positioning receiver 10 and an anomaly detection device 15. The receiver 10 comprises a plurality of different processing channels 1 to N, each processing channel being dedicated to a satellite and comprising a carrier and code discriminator 21 delivering a carrier phase difference and a code difference between the signal received from the corresponding satellite and the local signal. In the case where the receiver 10 is incorporated in a vectorized loop architecture or in a hybridization architecture of ultra-tight coupling type, the code and carrier discriminators 21 of the receiver 10 are not constrained to an output value close to zero and their variations are therefore representative of the fluctuations of the signals received by the receiver 10. Thus, the higher the value delivered by a discriminator relative to the zero value, the greater the risk of the signal received by the receiver 10 being errored. The invention then consists in exploiting the values delivered by the discriminators 21 to identify and eliminate the errored signals. For this, as represented in FIG. 5a, the anomaly detection device 15 comprises a comparison device 16 including a first threshold value S1 and connected to the output of all the discriminators 21, and a measurement error identification device 18 connected to the output of the comparison device 16. The comparison device 16 comprises a first set of N comparators 161, 162, . . . 16N corresponding to the N channels 1 to N. The first set of N comparators 161 to 16N is intended to receive all the code difference values DCi, where i is an integer number between 1 and N, delivered by the discriminators 21 of all the channels 1 to N of the receiver 10, to compare the code difference values delivered by each discriminator 21 with the same first threshold value S1 and to deliver the results of the comparison on a plurality of outputs each corresponding to one of the reception channels 1 to N of the receiver 10. The first threshold value S1 is defined by the user and corresponds to a maximum code difference value that the user is ready to accept at the output of the discriminators 21. The measurement error identification device 18 comprises N error identification channels 181, 182, . . . 18N linked to the output of the first set of N comparators 161 to 16N. The measurement error identification device 18 is intended, from the results $\Delta DCi$, where i is between 1 and N, of each comparison, to assign a confidence indicator IC1, IC2, . . . ICN to the reliability of each signal 51, 52, . . . 5N received and to identify the errored navigation signals, that is to say the signals corresponding to a confidence indicator of low value, lower than a minimum confidence indicator ICmin.

Advantageously, as represented in FIG. 5b, the comparison device 16 can also comprise a second set of N comparators 171 to 17N including a second threshold value S2 and connected to the output of all the discriminators 21. The comparison device 16 can then, also, compare the phase difference values DPi, where i is between 1 and N, delivered by each discriminator 21 to said same second threshold value S2 and the error identification device 18 can, from the results of each comparison, determine the phase differences DPi that are higher than the second threshold value S2. In this case, the confidence indicator IC1 to ICN assigned to each received signal is determined by taking into account the results $\Delta DCi$ and $\Delta DPi$, where i is between 1 and N, of the comparisons deriving on the one hand from the code differences DCi and on the other hand from the phase differences DPi relative to the first, respectively to the second, threshold value S1, S2.

The anomaly detection device 15 can be used to only obtain information on the reliability of the position measurements reported by the receiver 10. In this case, the calculation of the innovation parameter is unchanged and determined by the channel filter 11 from all the GNSS navigation signals.

Since the identification of the errored signals is carried out at the output of the code DSC and phase DSP discriminators 21 of each channel by comparison of each signal delivered by the discriminators, independently of the other signals, to one and the same first threshold value S1 and possibly to one and the same second threshold value S2, the anomaly detection device 15 can also be used to exclude the errored signals upstream of the channel filter 11 and to perform, in the channel filter 11, an innovation calculation solely on the basis of the code error values DCi and the carrier phase error values DPi of the reliable estimated signals. The position of the correlators is then determined with a greater accuracy than in the prior art where all the signals, including the errored signals, are used in the channel filter 11 to calculate the innovation parameter, and where the errored signals are more difficult to detect.

Figure 6:
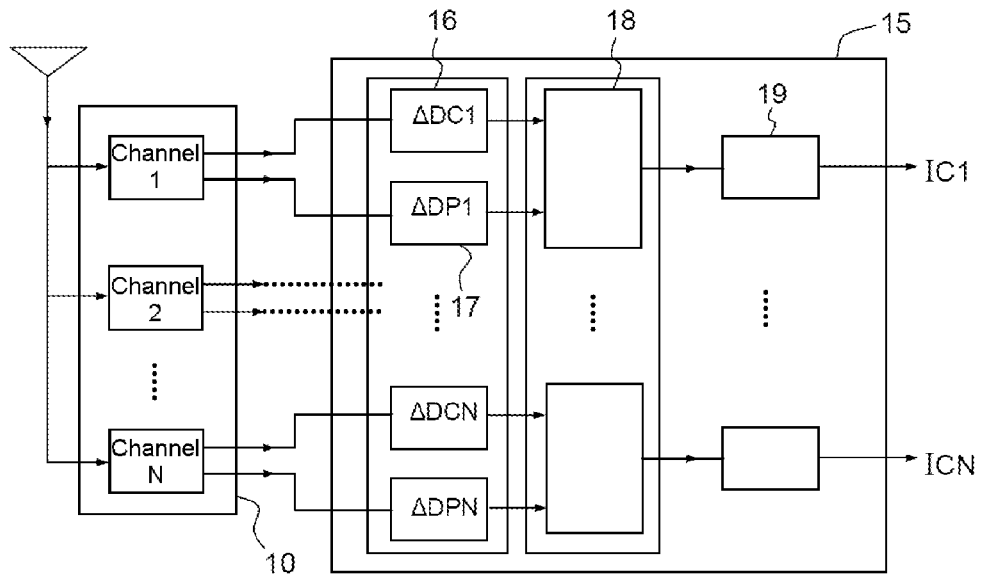
FIG. 6: a diagram of a third exemplary architecture of a system for detecting anomalies on GNSS navigation signals, according to the invention.

In this case, as represented in FIG. 6, according to the invention, the anomaly detection device 15 also comprises an additional device, called selection device 19, comprising a plurality of inputs connected to different outputs of the error identification device 18 and a plurality of outputs intended to be connected to the channel filter 11. The selection device 19 is intended to select the signals that have a confidence indicator higher than a predetermined minimum confidence indicator ICmin below which a navigation signal is estimated to be errored and to transmit only the selected signals to the channel filter 11 of the vectorized loop architecture or of the INS/GNSS architecture. The calculation of the innovation parameter in the channel filter 11 is then carried out, in the case of the vectorized loop architecture, by taking into account only the set of information extracted from the GNSS navigation signals having been estimated as reliable and, in the case of the INS/GNSS hybridization architecture, by taking into account only the set of information extracted from the GNSS signals having been estimated as reliable and from the information obtained from the inertial unit 14.

Figure 7:
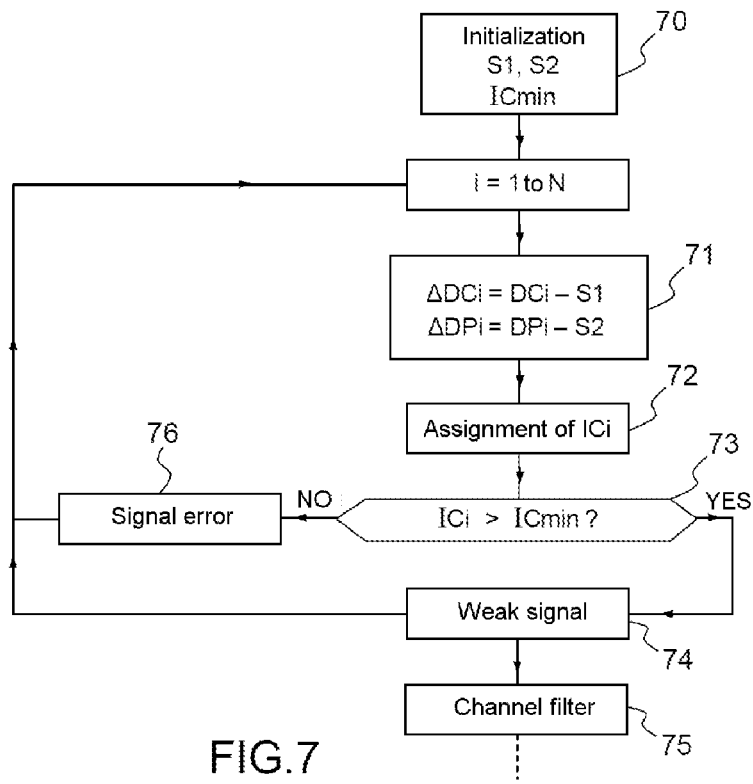
FIG. 7: an exemplary algorithm for detecting anomalies and selecting reliable GNSS signals, according to the invention.

FIG. 7 represents an exemplary algorithm for detecting anomalies and for selecting reliable GNSS signals. In a first initialization step 70, the first and second threshold values S1 and S2 and the value of the minimum confidence indicator ICmin are chosen. In a second step 71, the code difference values DCi and DPi delivered at the output of the discriminators 21 of each channel i of the GNSS receiver 10, where i is an integer number between 1 and N, are respectively compared to the first and second threshold values S1 and S2, the results of each comparison being denoted $\Delta$DCi, respectively $\Delta$DPi. In a third step 72, from the results $\Delta$DCi and $\Delta$DPi of each comparison, a confidence indicator IC1, IC2, ... ICN on the reliability of each signal 51, 52, ... 5N received is assigned to each channel i. In a fourth step 73, a comparison test is carried out between each confidence indicator ICi assigned to each channel i and the minimum confidence indicator ICmin. When the comparison test indicates that the confidence indicator ICi assigned to the channel i is higher than the minimum confidence indicator ICmin, the signal is identified as reliable in step 74 and selected to be transmitted to the channel filter 11 in step 75, when the anomaly detection system is incorporated in a vectorized loop architecture or in a hybridization architecture. Otherwise, the signal is identified as errored in step 76 and is not transmitted to the channel filter 11.

Figure 8:
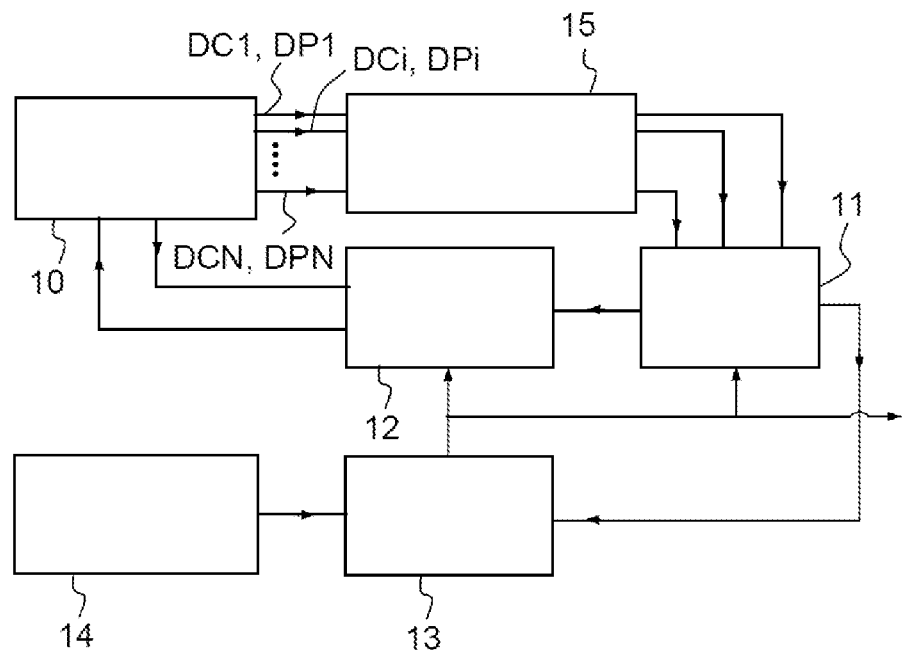
FIG. 8: an exemplary hybridization architecture including a device for detecting anomalies and for selecting reliable GNSS signals, according to the invention.

FIG. 8 represents an exemplary hybridization architecture including a device for detecting anomalies and for selecting reliable GNSS signals, according to the invention. This architecture comprises the same devices and the same structure as the architecture represented in FIG. 3 and also includes a device 15 for detecting anomalies and for selecting reliable GNSS signals connected between the receiver 10 and the channel filter 11. The device for detecting anomalies and for selecting reliable GNSS signals extracts the code error values DC1 to DCN and the carrier phase error values DP1 to DPN delivered at the output of the discriminators 21 of the GNSS receiver 10, compares them to the first and second respective threshold values S1, S2, deduces therefrom a confidence indicator IC1 to ICN and selects and transmits only the code error values DC1 to DCN and the carrier phase error values DP1 to DPN of the signals estimated to be reliable to the channel filter 11.

Figure 9:
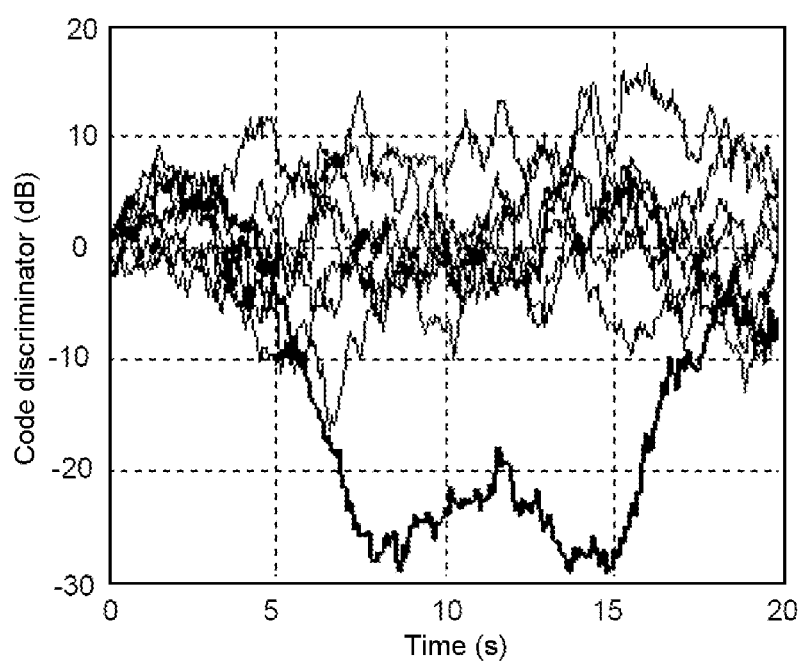
FIG. 9: an example of a curve illustrating the trend, as a function of time, of the outputs of the code discriminators of a GNSS receiver, the GNSS receiver being incorporated in a hybridization architecture of ultra-tight coupling type, according to the invention.

FIG. 9 represents an exemplary curve illustrating the trend, as a function of time, of the outputs of the code discriminators of a satellite positioning receiver 10, the receiver 10 being incorporated in a hybridization architecture of ultra-tight coupling type, for noisy signals in which the level of the signal-to-noise ratio C/N0 is equal to 19 dBHz. In this configuration, as described in relation to FIGS. 5 and 6, the correlators are controlled together from a joint estimation of their code offset, so that the discriminators deliver error signals which are not constrained to a value close to zero. This FIG. 9 shows that, even when the noise level is strong compared to the level of the signal, the errored signals delivered at the output of the code discriminators of each channel are very clearly distinguished from the reliable signals and can be easily detected by comparing them to a threshold. The threshold is chosen according to the desired application. The threshold may, for example, correspond to a false alarm probability or to a desired position and speed measurement accuracy. In FIG. 9, a threshold of −20 dB makes it possible to detect the signal represented by thick lines and corresponding to an errored signal.

Although the invention has been described in relation to particular embodiments, it is obvious that it is in no way limited thereto and that it comprises all the technical equivalents of the means described as well as their combinations if the latter fall within the framework of the invention.

The invention claimed is:

1. A method for detecting anomalies on navigation signals received by N reception channels of a satellite positioning receiver, where N is an integer number greater than 1, each channel i, where i is between 1 and N, each of the N reception channels respectively including a carrier correlation circuit, a code correlation circuit including spot, advance and delay correlators, a code discriminator, a carrier phase discriminator, the code and carrier phase discriminators being connected to a common channel filter suitable for managing, jointly, a position of a spot, advance and delay correlators of the N reception channels to reduce code and carrier phase error values delivered by the code and carrier phase discriminators, the method comprising:
   extracting the code error values delivered at respective outputs of the N code discriminators;
   comparing the extracted code error values with a same first threshold value corresponding to an acceptable maximum code error value;
   assigning a confidence index to each navigation signal received on each reception channel i, the confidence index depending on the result of the comparison carried out on the code error values;

selecting navigation signals having a confidence index higher than a reference minimum confidence level; and transmitting to a common channel filter only the selected navigation signals.

2. The method for detecting anomalies on navigation signals according to claim 1, further comprising:

extracting carrier phase error values delivered at the respective outputs of the N carrier phase discriminators;

comparing the extracted carrier phase error values with a same second threshold value corresponding to an acceptable maximum phase error value; and assigning another confidence index to each navigation signal received on each reception channel, the another confidence index depending on the results of the comparison carried out on the code error values and on the carrier phase error values.

3. A system for detecting anomalies on navigation signals including a satellite positioning receiver with N reception channels, where N is an integer number greater than 1, each channel i, where i is between 1 and N, each of the N reception channels respectively including a carrier correlation circuit, a code correlation circuit including spot, advance and delay correlators, a code discriminator, a carrier phase discriminator, the code and carrier phase discriminators being connected to a common channel filter suitable for managing, jointly, a position of a spot, advance and delay correlators of the N reception channels to reduce code and carrier phase error values delivered by the code and carrier phase discriminators, the system comprising:

a device configured to detect anomalies on the navigation signals including at least one comparison device comprising a first set of N comparators respectively connected to respective outputs of the N code discriminators of the N reception channels of the satellite positioning receiver; and a device configured to assign a reliability confidence index connected to respective outputs of the N comparators of the at least one comparison device, the at least one comparison device including a first threshold value corresponding to an acceptable maximum code error value and the reliability confidence index being assigned to each navigation signal received on each reception channel as a function of a result of the comparison carried out on the code error values and delivered by the at least one comparison device, wherein the device configured to detect the anomalies is connected between the N code discriminators of the satellite positioning receiver and the common channel filter, the device configured to detect the anomalies further includes:

a selection device configured to select navigation signals, the selection device being connected to an output of the device configured to assign the reliability confidence index and to an input of the common channel filter, the selection device being configured to select the navigation signals that have a confidence index higher than the reference minimum confidence level and to transmit to the common channel filter only the code error values and the carrier phase error values of the selected navigation signals.

4. The system for detecting anomalies on navigation signals according to claim 3, wherein the at least one comparison device further comprises a second set of N comparators respectively connected to outputs of the N carrier phase discriminators of the N channels of the receiver, and wherein the device configured to assign the reliability confidence index is connected to an output of the first and the second set of N comparators, an output of the at least one comparison device, the comparison device storing a second threshold value corresponding to an acceptable maximum carrier phase error value, the reliability confidence index being assigned to each navigation signal received on each reception channel as a function of the result of the comparison carried out on the code error values and on the carrier phase error values and delivered by the at least one comparison device.

5. An INS/GNSS hybridization system, comprising a system for receiving navigation signals according to claim 3 and an inertial unit.

* * * * *